United States Patent [19]

Schenker et al.

[11] 4,203,822

[45] May 20, 1980

[54] METHOD OF PRODUCING SOLS BY ELECTRODIALYSIS

[75] Inventors: Barry A. Schenker, Mayfield Heights; Thomas T. Sugano, Painesville; Neil W. Stillman, Madison; Kevin J. O'Leary, Cleveland Heights, all of Ohio

[73] Assignee: Diamond Shamrock Corporation, Dallas, Tex.

[21] Appl. No.: 6,091

[22] Filed: Jan. 24, 1979

Related U.S. Application Data

[60] Division of Ser. No. 787,314, Apr. 14, 1977, Pat. No. 4,147,605, which is a continuation-in-part of Ser. No. 669,188, Mar. 22, 1976, abandoned.

[51] Int. Cl.$^2$ ............................................. B01D 13/02
[52] U.S. Cl. ................................... 204/301; 204/1 R; 204/180 P
[58] Field of Search ............... 204/1 R, 149, 152, 151, 204/301, 252, 180 P

[56] References Cited

U.S. PATENT DOCUMENTS

| | | | |
|---|---|---|---|
| 3,716,459 | 2/1973 | Salter et al. | 204/1 R |
| 3,755,114 | 8/1973 | Tarjanyi et al. | 204/149 X |
| 3,945,892 | 3/1976 | James et al. | 204/1 R |
| 3,966,571 | 6/1976 | Gagnon et al. | 204/1 R X |
| 3,969,201 | 7/1976 | Oloman et al. | 204/1 R X |

OTHER PUBLICATIONS

Wilson, "Demineralization by Electrodialysis," (1960), TD, 433 PTG-2, pp. 38–41.

*Primary Examiner*—Arthur C. Prescott
*Attorney, Agent, or Firm*—Bruce M. Winchell

[57] ABSTRACT

A method of producing a sol of an element selected from the group consisting silicon, aluminum, antimony, chromium, manganese, molybdenum, tin and tungsten comprising electrodialytically transferring alkali metal cations of an aqueous solution of a water soluble alkali metal salt of the oxide of the said element from an anode compartment of an electrolytic cell to a cathode compartment of the electrolytic cell while essentially preventing the migration of the metal oxide into the cathode compartment by positioning a cation permselective membrane between the anode compartment and the cathode compartment while carefully and continuously controlling the pH of the solution and removing the so-produced sol from the anode compartment of the electrolytic cell as well as a novel electrodiayltic cell for sol formation.

2 Claims, 2 Drawing Figures

METHOD OF PRODUCING SOLS BY ELECTRODIALYSIS

PRIOR APPLICATION

This is a division, of application Ser. No. 787,314, filed Apr. 14, 1977, now U.S. Pat. No. 4,147,605 which is continuation in part of U.S. patent application Ser. No. 669,188 filed Mar. 22, 1976 now abandoned.

DESCRIPTION OF THE PRIOR ART

Sols have a wide variety of applications. A major user of silica sol is the steel industry since the steel mills use sols as a binder in the makeup of the stools on which a hot ingot cools. The sol acts as a thermal insulator, or an anti-bonding agent, to keep the hot ingot from sticking to the stool. Another major user is the investment casting industry wherein the investment caster uses the sol as a binder for very high precision casting molds. Other interesting side uses for silica sol are in the floor polish and toothpaste industries. In floor polish, sols act as anti-slip agents. Also because the particles are very small, there is virtually no light scattering, and the polish is clear. In toothpaste, colloidal silica, in the form of silica gel, is used as an abrasive. The silica particles are much smaller than the normally used phosphate particles and this results in less tooth enamel abrasion.

Various techniques for producing silica sols are known to the art. For example, U.S. Pat. No. 1,562,940 concerns a process for producing silicic acid by electrolyzing an aqueous solution of water glass between an anode and a mercury cathode while continuously agitating the anode by having means affixed thereto to effect its rotation.

In U.S. Pat. No. 3,654,105 and 3,654,865, general techniques for producing silica sols are disclosed which include the step of passing an electric current between an anode and a cathode which are positioned in a specified electrolyte with the anode being fabricated from silicon or a silicon containing material.

U.S. Pat. No. 3,668,088 discloses an electrodialysis process for making silica sols. In this electrodialysis process, a sol-electrolyte containing an aqueous sodium silicate solution is electrolyzed while separated from an acid anolyte by a cation-permeable, anion-impermeable membrane. Hydrogen ions from the anolyte are drawn through the membrane into the sol-electrolyte and sodium ions are removed from the electrolyte by bringing them into contact with a mercury cathode so as to form a mercury-sodium amalgam. The silica form the sodium silicate deposits on the silica particles present in the sol-electrolyte.

While the foregoing methods and techniques concern electrolytic or electrodialytic production of silica sols, none of them provides an efficient, economically attractive means for producing high purity, stable, high silica containing sols.

U.S. Pat. No. 3,723,273 discloses a process for the preparation of a stannic oxide sol by electrodialysis of potassium stannate solutions with a cation permselective dialytic membrane.

OBJECTS OF THE INVENTION

In its broadest aspect, the instant invention concerns a method of producing a metal sol which comprises electrodialytically transferring alkali metal cations of an aqueous solution of a water-soluble alkali metal metal oxide from an anode compartment of an electrolytic cell to a cathode compartment of the electrolytic cell while essentially preventing the migration of metal material into the cathode compartment by positioning a cation permselective membrane between the anode compartment and the cathode compartment while carefully and continuously controlling the pH of the solution, and removing the so-produced metal sol from the anode compartment of the electrolytic cell.

In another aspect, the invention concerns a method of producing silica sols by electrodialysis wherein deposition of silica on the anode is minimized or essentially avoided by carefully controlling the pH of the anolyte. Specifically, during electrolysis, the pH of the anolyte is maintained at a valve ranging from about 7.5 to about 8.5 to prevent silica from depositing on the anode.

It is a further object of the invention to provide a novel electrodialysis cell comprising a housing defining an anode compartment and a cathode compartment, with the anode compartment being provided with an inlet and an outlet for removing anolyte therefrom; a cation permselective membrane separating the anode compartment from the cathode compartment; an anode positioned in the anode compartment, and a cathode positioned in the cathode compartment for passing electrical current through the cell; and a conduit communicating with the inlet and outlet of anode compartment whereby anolyte can be circulated through the anode compartment.

These and other objects and advantages of the invention will become obvious from the following detailed description.

THE INVENTION

The novel method of the invention for producing a sol of an element selected from the group consisting of silicon, aluminum, antimony, chromium manganese, molybdenum, tin and tungsten comprises electrodialytically transferring alkali metal cations of an aqueous solution of a water soluble alkali metal salt of the oxide of the said element from an anode compartment of an electrolytic cell to a cathode compartment of the electrolytic cell while essentially preventing the migration of metal oxide material into the cathode compartment by positioning a cation permselective membrane between the anode compartment and the cathode compartment while carefully and continuously controlling the pH of the solution and removing the so-produced sol from the anode compartment of the electrolytic cell.

THE INVENTION

Figure 1:
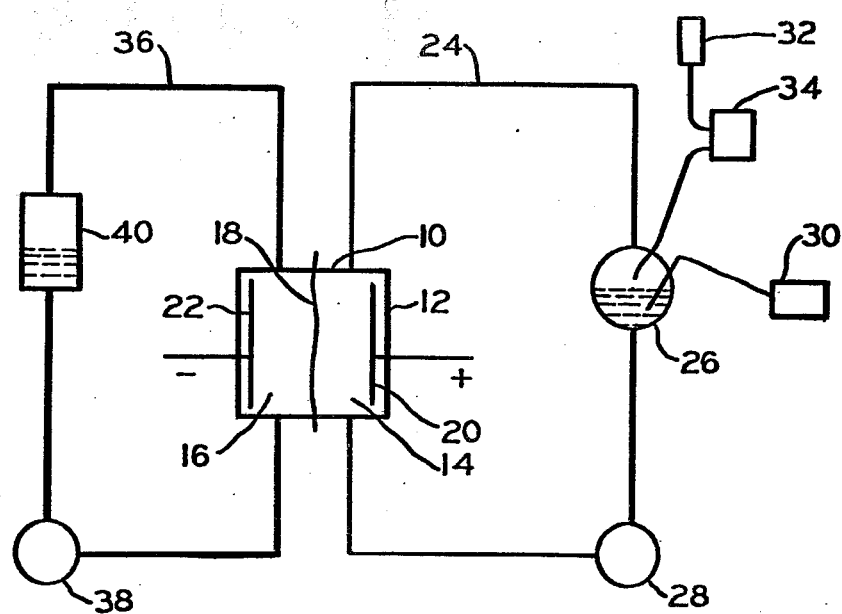
FIG. 1 is a diagrammatic illustration of an apparatus suitable for the practice of the invention. Specifically, electrodialysis cell 10 is shown having an enclosing housing 12 which defines an anode compartment 14 and a cathode compartment 16, which are separated from each other by a cation permselective membrane 18. An anode 20 is positioned in the anode compartment and a cathode 22 is located in the cathode compartment. An anolyte circulating loop or means 24 is in fluid communication with the anode compartment 14. The anolyte circulating means includes a reservoir 26 and a pump 28. The reservoir is provided with a pH measuring means 30 and is in fluid communication with a feed reservoir 32 through a feed control means 34. If desired the feed means can be in electrical contact with the pH measuring means 30 for controlling its activation. The catholyte circulating loop or means 36 includes a pump 38 and a reservoir 40 and is in fluid communication with the cathode compartment 16.

The electrolytical cell used in the practice of the invention is generally of the before described type. Basically, it consists of an anode compartment and cathode compartment separated from each other by a cation permselective membrane. The anode compartment is provided with an anolyte circulating loop which is used to remove anolyte from the anode compartment and return it thereto, as desired. This loop is used as a convenient conduit for adding material to the anolyte. Likewise, the cathode is provided with a catholyte circulating loop. This loop is used primarily as a convenient means of containing catholyte. In the preferred embodiment, the cell has a generally diamond-shaped vertical cross-section (see FIG. 2) with the uppermost portion of the cell having an outlet for removing anolyte from the anode compartment and the lowermost portion being provided with an inlet for returning anolyte to the anode compartment.

The electrodes utilized in the electrolytic cell can be fabricated from any suitable material, as long as the material is compatible with the specific environment found in the cell. In the preferred practice of the invention the anode is fabricated of a valve metal such as titanium, tuntalum, zirconium, niobium or hafnium and has on the surface thereof a conductive coating of a platinum group metal, metal oxide or mixture thereof as described in U.S. Pat. Nos. 3,778,307 or 3,711,385, for example. The anode is usually in sheet form. The cathode can be fashioned from any suitable material such as steel, stainless steel, nickel or iron, and a cathode of steel mesh has been found to exhibit exceptional performance characteristics.

The permselective membrane must be cation permeable. Generally, the membrane may be either a polymer containing copolymerized sulfonated styrene or a polymer containing copolymerized unsaturated carboxylic acids. The former are known as "sulfonic acid type membrane" and the latter are known as "carboxylic acid type membranes".

The hydraulically impermeable cation exchange membrane which will accomplish the objects of the invention as stated hereinabove has a substrate film material. The substrate material may be any of a number of commercially available hydraulically impermeable cation exchange membranes which are chemically resistant to the electrolytes to be used in the electrolyte cell for the particular process for which the membrane is desired, as long as it has a low resistance value so as to accomplish a high current efficiency for the given cell, and a sufficient lifetime so as to make its use in the given electrolytic cell economical for commercial electrochemical production.

One type of substrate material which may be used in the present invention is a thin film of fluorinated copolymer having pendent sulfonic acid groups which is derived from monomers of the formula $$CF_2=CF+R+_nSO_2F \qquad \text{I}$$

in which the pendent —SO$_2$F groups are converted to —SO$_3$H groups, and monomers of the formula $$CF_2=CXX^1 \qquad \text{II}$$

wherein R represents the group $$-CF-CF_2-O+CFY-CF_2-O+_m$$
$$\phantom{-CF}|$$
$$\phantom{-CF-CF_2-O+CF}R^1$$

in which the R$^1$ is fluorine or fluoroalkyl of 1 to 10 carbon atoms; Y is fluorine or trifluoromethyl; m is 1, 2 or 3; n is 0 or 1; X is fluorine, chlorine or trifluoromethyl; and X$^1$ is X or CF$_3$—CF$_2$—$_a$O—, wherein a is 0 or an integer from 1 to 5. This results in copolymers having the repeating structural units $$-CF_2-CF- \qquad \text{III}$$
$$\phantom{-CF_2-}|$$
$$\phantom{-CF_2-}(R)_n$$
$$\phantom{-CF_2-}|$$
$$\phantom{-CF_2-}SO_3H$$

and $$-CF_2-CXX^1- \qquad \text{IV}$$

In the copolymer, there should be sufficient repeating units according to formula III above, to provide an a —SO$_3$H equivalent weight of about 1000 to 1400. Materials having a water absorption of about 25 percent or greater are preferred since higher cell voltages at any given current density are required for materials having less water absorption. Similarly, materials having a film thickness (unlaminated) of about 8 mils or more, require higher cell voltages resulting in a lower power efficiency.

Typically, because of the large surface areas of the membrane in commercial cells, the substrate film material will be laminated to and impregnated into a hydraulically permeable, electrically non-conductive, inert, reinforcing member, such as a woven or non-woven fabric made of fibers of asbestos, glass, TEFLON, or the like. In film fabric composite materials, it is preferred that the laminating produce an unbroken surface of the film resin on at least one side of the fabric to prevent leakage through the substrate film material.

The materials of this type are further described in the following patents which are hereby incorporated by reference: U.S. Pat. Nos. 3,041,317; 3,282,875; 3,624,053; British Patent No. 1,184,321 and Dutch Published Application No. 72/12249 corresponding to U.S.

Pat. No. 3,184,399. Substrate materials as aforedescribed are available from E. I. duPont deNemours and Co. under the trademark NAFION XR.

A second type of substrate material has a backbone chain of copolymers of tetrafluoroethylene and hexafluoropropylene and grafted onto this backbone a fifty-fifty mixture of styrene and alpha methyl styrene. Subsequently, these grafts may be sulfonated or carbonated to achieve the ion exchange characteristic. This type of substrate while having different pendent groups has a fluorinated backbone chain so that the chemical resistivities are reasonably high.

Another type of substrate film material would be polymeric substances having pendent sulfonic acid groups wherein the polymeric backbone is derived from the polymerization of a polyvinyl aromatic component with a monovinyl aromatic component in an inorganic solvent under conditions which prevent solvent evaporation and result in a generally copolymeric substance although a 100 percent polyvinyl aromatic compound may be prepared which is satisfactory.

The polyvinyl aromatic component may be chosen from the group including: divinyl benzenes, divinyl toluenes, divinyl napthalenes, divinyl diphenyls, divinyl-phenyl vinyl ethers, the substituted alkyl derivatives thereof such as dimethyl divinyl benzenes and similar polymerizable aromatic compounds which are polyfunctional with respect to vinyl groups.

The monovinyl aromatic component which will generally be the impurities present in commercial grades of polyvinyl aromatic compounds include: styrene, isomeric vinyl toluenes, vinyl napthalenes, vinyl ethyl benzenes, vinyl chlorobenzenes, vinyl sylenes, and alpha substituted alkyl derivatives thereof, such as alpha methyl vinyl benzene. In cases where high-purity polyvinyl aromatic compounds are used, it may be desirable to add monovinyl aromatic compounds so that the polyvinyl aromatic compound will constitute 30 to 80 mole percent of polymerizable material.

Suitable solvents in which the polymerizable material may be dissolved prior to polymerization should be inert to the polymerization (in that they do not react chemically with the monomers or polymer), should also possess a boiling point greater than 60° C., and should be miscible with the sulfonation medium.

Polymerization is effected by any of the well known expedients for instance, heat, pressure, and catalytic accelerators, and is continued until an insoluble, infusible gel is formed substantially throughout the volume of solution. The resulting gel structures are then sulfonated in a solvated condition and to such an extent that there are not more than four equivalents of sulfonic acid groups formed for each mole of polyvinyl aromatic compound in the polymer and not less than one equivalent of sulfonic acid groups formed for each ten moles of poly- and monovinyl aromatic compound in the polymer. As with the NAFION type material, these materials may require reinforcing of similar materials.

Substrate film materials of this type are further described in the following patents which are hereby incorporated by reference: U.S. Pat. Nos. 2,731,411 and 3,887,499. These materials are available from Ionics, Inc. under the trademark IONICS CR6.

The anolyte is an aqueous solution of at least one water-soluble alkali metal - metal oxide. Preferably, it is an aqueous solution of sodium or potassium metal oxide such as sodium silicate. On start-up, it is preferably present in an amount ranging from about 0.1 to about 5.0 percent (as metal oxide). Obviously, during operation of the cell the concentration of metal sol in the anolyte will increase. Typically, during cell operation, the concentration of metal sol can range from about 5 to about 35 weight percent.

In addition, it is noted that the anolyte on start-up should contain some metal sol to serve as a nucleation agent. It is preferred that about 1 weight percent metal sol be present on initial cell start-up, with the minimum being about 0.1 percent. This is accomplished such as by heating an aqueous solution of sodium silicate to a suitable temperature.

The catholyte may be a solution of at least one alkali metal hydroxide. Preferably, the alkali metal hydroxide used is sodium hydroxide. The alkali metal hydroxide generally is present in an amount ranging from about 1 to about 20 percent, with about 5 percent being preferred. This is the catholyte concentration on start-up and obviously, the concentration of sodium hydroxide will increase during operation of the cell.

In the preferred embodiment of the invention, a plurality of particles (beads) are placed in the anode compartment. As anolyte is circulated through the anode compartment via the anolyte loop, these beads are fluidized. This causes the beads to randomly impinge upon the surface of the anode and thereby substantially prevent sol from being deposited or building up on the anode surface. In practice, it is preferred to utilize beads (or particles) which are non-conductive. The size thereof is not critical, but they must be sufficiently small to be fluidized by anolyte flow.

In the preferred cell arrangement, the anolyte loop is provided with a reservoir which is in communication with a pH meter and a source of anolyte such as alkali metal silicate. The pH meter and the source of feed are coupled together so that alkali metal oxide or acid can be added to the anolyte as a function of pH or pH change. The catholyte loop is simply provided with a reservoir for storing and, if desired, removing catholyte. Obviously, both loops can be actuated in any known manner, for example, by means of conventional pumps.

In use, direct electrical current is passed between the anode and the cathode and when such a current is applied, oxygen gas is produced at the anode and hydrogen is generated at the cathode. These gases may be collected, if desired, or simply vented out of the system by any convenient means.

During the formation of the metal sol, the temperature of the anolyte is maintained at least at a level where metal oxide sol particle nuclei formation occurs, usually in excess of about 40° C., with the preferred range being from about 60 to about 80° C.

The electrolytic cell may be operated at an anode current density ranging from about 0.1 to about 2 amperes per square inch, with the preferred current density ranging from about 0.75 to about 1 amperes per square inch. The cell voltage can be generally maintained in the range of from about 10 to about 30 volts, with the preferred voltage ranging from about 10 to about 15 volts.

Obviously, the present invention can be practiced in a single or multiple cell arrangement. In addition, various cell designs and configurations can be utilized. Essentially, all that is required is that anode and cathode compartments be provided which are separated from each other by a cation permselective membrane.

In operation, care must be taken to prevent deposition on the anode which is accomplished by carefully controlling the pH of the anolyte. This is done to keep the alkali metal ion concentration constant. In practice, it has been found that in the case of silica, deposition can be essentially prevented by maintaining the pH of the anolyte in a range from about 7.5 to about 8.5. This is effected by monitoring the pH of the anolyte during electrodialysis and as it approaches a pH of about 8 metering into the anolyte an amount of silicate sufficient to keep the pH at the desired level. It has been quite unexpectedly discovered that this pH control technique enables one to produce silica sols having a solid content ranging from about 1 to about 30 percent without causing the anode to lose its electrical efficiency due to the deposition of silica thereon.

The particular pH range to be maintained will vary depending upon the particular sol to be formed and the particular alkali metal ion used to form the sol. If the pH of the anolyte is too high, the sol, if formed, will deposit on the anode and cause inactivation thereof. If the pH of the anolyte is too low, the sol, if formed, will not be sufficiently stable and will form agglomerates which precipiate out. The prior art processes did not adjust the pH so the results were erratic.

Examples of pH range for sols other than silica are to for aluminum oxide sols, 9.5 to 10.5 for antimony oxide sols, 2.5 to 3.5 for molybdenum oxide sols, to for chromium oxide sols, 10.3 to 10.8 for stannic oxide sols and to for tungsten oxide sols. The control of the pH is necessary to form the sol and once formed to make it stable without agglomeration or deposition on the anode.

Figure 2:
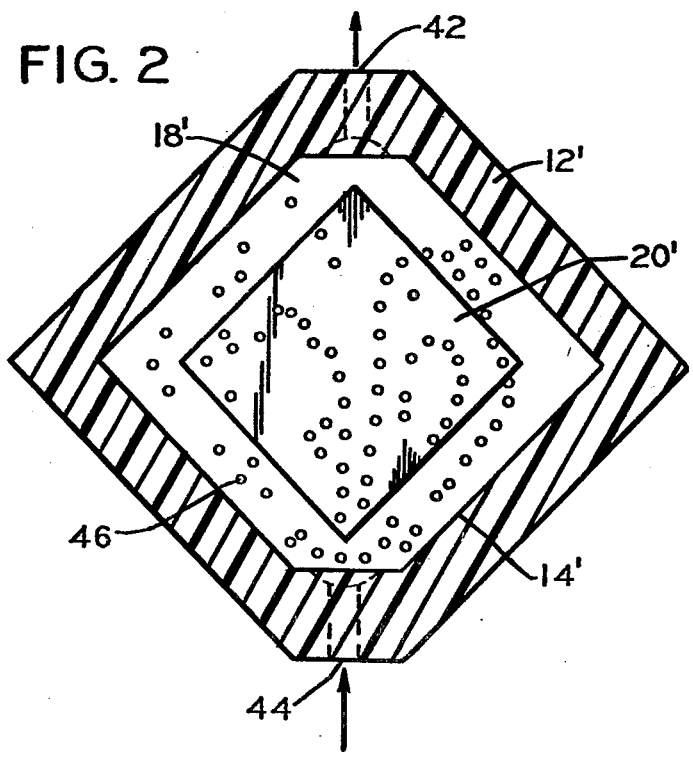
FIG. 2 is a diagrammatical illustration of the preferred anode compartment configuration and includes a housing 12′, which is generally diamond-shaped in vertical cross-section, having a hollow interior which defines the anode compartment 14′. This compartment is defined by the housing which has first and second end members. The uppermost portion of the housing is provided with an outlet 42 while the lowermost portion has an inlet 44. The anode compartment contains an anode 20′. One end of the compartment is closed by the first end member, i.e., by permselective member 18′. The opposite end of the compartment is covered (not shown) by a second end member, which can be fabricated from any suitable material. If desired, a plurality of particles 46, preferably glass beads, are positioned in the anode compartment 14′. As anolyte is circulated through the anode compartment, these particles are fluidized. If desired, the cathode compartment can be fabricated so as to have the same general configuration as the anode compartment with the only essential difference being in the specific type and configuration of electrode (cathode) utilized.

In a preferred embodiment of the electrodialytic cell of the invention, the cell configuration is that of FIG. 2 wherein the cell is diamond-shaped with one of the points of the diamond pointing downward with the inlet for the anolyte being at the base. This configuration is especially useful when employed with the impinging beads to prevent deposition of silica on the anode. The configuration of the cell allows maximum bead circulation wherein the beads are carried up the center of the cell to the top of the diamond and the beads then fall back down the sides of the cell into the upward circulation of the anolyte. This gives the maximum amount of impingement and allows the current density to be increased without silica deposits on the anode.

In the following examples there are described several preferred embodiments to illustrate the invention. However, it should be understood that the invention is not intended to be limited to the specific embodiments.

EXAMPLE 1

An electrolytic cell of the type described above was assembled. About 15 g of glass beads having a diameter of about 4 millimeters were added to the anode compartment. Anolyte containing 1 weight percent $SiO_2$ was added to the anode compartment. The cathode compartment was filled with a 5 percent sodium hydroxide solution. The anolyte was then heated to a temperature of about 60° C. At this point, slow electrolysis was started at about one-fourth asi (amperes per square inch). The original voltage was approximately 4 volts. The pH was monitored and found to be about 10.7. Electrolysis at one-fourth asi was continued until the pH dropped to about 8.0, with the cell voltage now at 20 volts. The pH was then maintained at this level by adding sodium silicate to the anolyte, as necessary. The addition of sodium silicate was accomplished by means of a peristaltic pump which pumped material from a reservoir into the anolyte via the anolyte loop. The concentration of the sodium silicate in the reservoir or storage vessel was about 40 percent solids (with $SiO_2$ content being 29 percent). When the voltage of the cell dropped to about 15 volts, the current density was increased by one-eighth asi and the system restabilized by the addition of additional sodium silicate. The current density was then further increased in one-eighth asi increments, while stabilizing the anolyte as above-described, until a final current density of 1 asi was achieved. The density of anolyte was monitored and used as a means of indicating the amount of silica sol found in the anolyte. The foregoing system was operated for six hours and the anolyte removed therefrom. The resultant silica sol had a concentration of about 30 percent silica. The average particle size of silica was about 20 millimicrons.

EXAMPLE 2

A silica sol was produced using the apparatus and technique described in Example 1 with the only significant difference being that glass beads were not utilized. By carefully maintaining the pH within the range of from about 7.5 to about 8.5, deposition of silica on the anode was essentially prevented. The cell evidenced excellent overall operational charateristics. The resulting silica sol had a concentration of about 30 percent with an average particle size of about 20 millimicrons. Silica sols produced in accordance with the practice of the present invention find application in a myriad of different fields. For example, it is widely used as a binder in the manufacture of investment castings and as fillers for paints and plastics.

EXAMPLE 3

Using the electrodialysis cell of copending application Ser. No. 669,188 equipped with a Nafion membrane, the starting catholyte was 5% sodium hydroxide solution and the starting anolyte was an aqueous solution of 25 g per liter of $Na_2SbO_3$ and the solutions were circulated in the cell operated at a current of ⅛ asi and the pH of the anolyte was stabilized at 10 by careful monitoring and feeding an aqueous solution of 50 g per liter of $Na_2SbO_3$ and 400 g per liter of sodium hydroxide. Sodium hydroxide was required in the anolyte feed to maintain the pH of 10 and the process was run for 6 hours to obtain a stable antimony oxide sol with a particle size of 15 m$\mu$.

Running the same process with an anolyte of 50 g per liter of $Na_2SbO_3$ and a feed solution of the same composition, the anolyte had a pH of 2 and no sol was formed.

EXAMPLE 4

Using the procedure of Example 1 with a starting catholyte of 5% sodium hydroxide solution and a starting anolyte of 1% $Na_2MoO_4$ solution, the anolyte and catholyte were preheated to 45° C. and the current was ¼ asi. The initial anolyte feed had a pH of 5.5 and dropped to 3.0 where it was maintained by addition of a 20% $Na_2MoO_4$ solution. After 165 minutes of operation, a stable molybdenum oxide sol with a particle size of 13 m$\mu$ and a concentration of 10% was obtained.

Repeating the said process only using an anolyte feed of 30% $Na_2MoO_4$ resulted in formation of a molybdenum oxide sol with fine particles. Repeating the process with an initial anolyte of 1% $Na_2MoO_4$ without pH control by a feed solution resulted in no sol formation and a pH ranging from 6.6 to 1.9. Repeating the process with an initial anolyte of 3% $Na_2MoO_4$ without pH control by a feed solution resulted in no sol formation and a pH ranging from 7.3 to 2.0.

EXAMPLE 5

Using the procedure of Example 3, the process was started with a 5% sodium hydroxide catholyte and a 1% $Na_2SnO_2$ anolyte, the current was ¼ asi. The starting pH was 11 and the pH was stabilized at 10.5 with a 20% $Na_2SnO_2$ feed solution. After 3¼ hours, a stable stannic oxide sol with a particle size of 75 m$\mu$ and a concentration of 8% was obtained.

Repeating the process with a 3% $Na_2SnO_3$ anolyte without pH control resulted in no sol formation and the pH ranged from 12.4 to 11.6. Repeating the process with a 4% $Na_2SnO_3$ anolyte and a current of ¼ asi without pH control resulted in no sol formation and a pH range of 11.4—10.8.

Various modifications of the process and sols of the invention may be made without departing from the spirit or scope thereof and it is to be understood that the invention is intended to be limited only as defined in the appended claims.

What I claim:

1. An electrodialytic cell comprising a housing defining an anode compartment and a cathode compartment, with the anode compartment having a diamond-shaped vertical cross-section and being provided with an inlet and an outlet for removing anolyte therefrom; said anolyte having therein a plurality of beads; a cation permselective membrane separating the anode compartment from the cathode compartment; an anode positioned in the anode compartment, and a cathode positioned in the cathode compartment for passing electrical current through the cell; and a conduit communicating with the inlet and outlet of anode compartment whereby anolyte can be circulated through the anode compartment so as to impinge said plurality of beads against said anode to prevent buildup on said anode.

2. The cell of claim 1 wherein the conduit is provided with a reservoir communicating with a reservoir communicating with a means of measuring the pH of the anolyte therein.

* * * * *